United States Patent [19]

Billeter

[11] Patent Number: 4,494,631
[45] Date of Patent: Jan. 22, 1985

[54] COMBINATION AIR CYLINDER AND HYDRAULIC SLACK ADJUSTER

[75] Inventor: Henry R. Billeter, Marco Island, Fla.

[73] Assignee: Sloan Valve Company, Franklin Park, Ill.

[21] Appl. No.: 424,060

[22] Filed: Sep. 27, 1982

[51] Int. Cl.³ ............................................. B60T 11/10
[52] U.S. Cl. .................... 188/153 R; 60/591; 60/593; 92/129; 188/196 A; 188/198
[58] Field of Search ............... 188/196 A, 198, 153 R, 188/153 D, 153 A, 351, 71.8, 1.11, 52, 72.4, 72.5, 79.5 P, 79.5 R, 347-348, 355, 358, 359, 360; 92/5 R, 64, 13.7, 62, 129, 117 R; 60/579, 590, 547.1, 547.2, 547.3, 543, 592, 593, 591; 303/114

[56] References Cited

U.S. PATENT DOCUMENTS

| | | | |
|---|---|---|---|
| 3,140,759 | 7/1964 | Cagle | 188/351 X |
| 3,447,647 | 6/1969 | Stipanovic | 188/153 R |
| 3,645,362 | 2/1972 | Schiebe | 188/351 X |
| 3,871,527 | 3/1975 | Schimmeyer et al. | 92/129 X |
| 3,893,544 | 7/1975 | Means | 188/196 A X |
| 4,012,080 | 3/1977 | Engle | 60/593 X |
| 4,114,378 | 9/1978 | Stanuszek | 92/129 X |
| 4,316,529 | 2/1982 | Yanagawa et al. | 188/1.11 |
| 4,319,671 | 3/1982 | Smith et al. | 188/153 R X |
| 4,356,897 | 11/1982 | Urban | 188/1.11 |
| 4,418,799 | 12/1983 | Hart et al. | 188/153 R |

Primary Examiner—Douglas C. Butler
Attorney, Agent, or Firm—Kinzer, Plyer, Dorn & McEachran

[57] ABSTRACT

A combination air brake cylinder and hydraulic slack adjuster for a railroad car brake system includes an air operated piston positioned within a housing. There is an air port in the housing in communication with the air piston and there is a return spring in the housing operable upon the air piston. The housing includes a fluid outlet port and a fluid piston and valve arrangement within the housing connected to the air piston and responsive to brake application movement thereof to supply a brake shoe application fluid pressure at said outlet. A fluid reservoir is associated wtih the fluid piston and valve arrangement and has check valve controlled connecting passages thereto for adjusting slack in the brake rigging during brake application functions.

5 Claims, 3 Drawing Figures

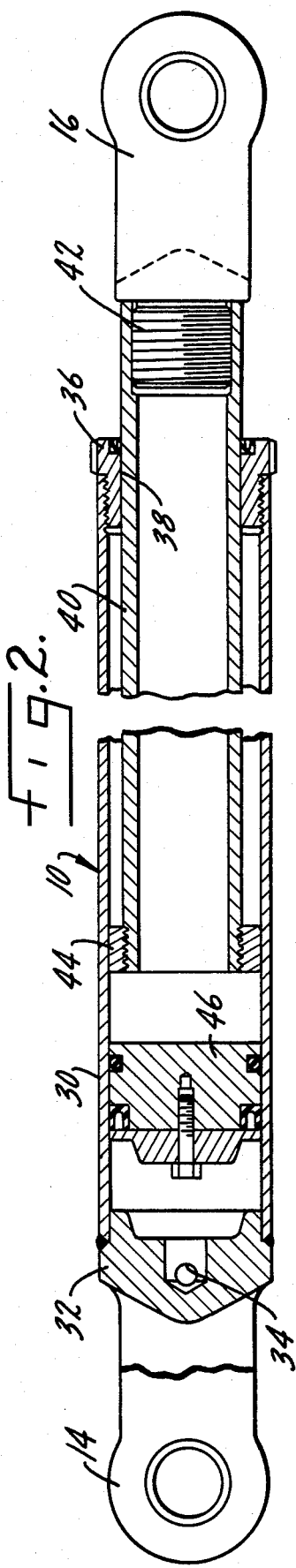

COMBINATION AIR CYLINDER AND HYDRAULIC SLACK ADJUSTER

SUMMARY OF THE INVENTION

The present invention relates to railroad car brake systems and in particular to a combination air brake cylinder and hydraulic slack adjuster for applying brake shoe application fluid pressure.

Another purpose is a combination air brake cylinder and hydraulic slack adjuster of the type described which utilizes an arrangement of check valve controlled passages between a fluid reservoir and the fluid piston and valve means within the cylinder for adjusting slack in the brake rigging during brake application functions.

Another purpose is a combination air brake cylinder and hydraulic slack adjuster of the type described which functions in cooperation with a hydraulic brake cylinder to apply hydraulic pressure to operate the brakes of a railroad car.

Other purposes will appear in the ensuing specification, drawings and claims.

BRIEF DESCRIPTION OF THE DRAWINGS

The invention is illustrated diagrammatically in the following drawings wherein:

FIG. 1 is a diagrammatic illustration of a portion of a railroad car air brake system, FIG. 2 is an enlarged axial section through the hydraulic brake cylinder of the brake system of FIG. 1.

DESCRIPTION OF THE PREFERRED EMBODIMENT

Figure 3:
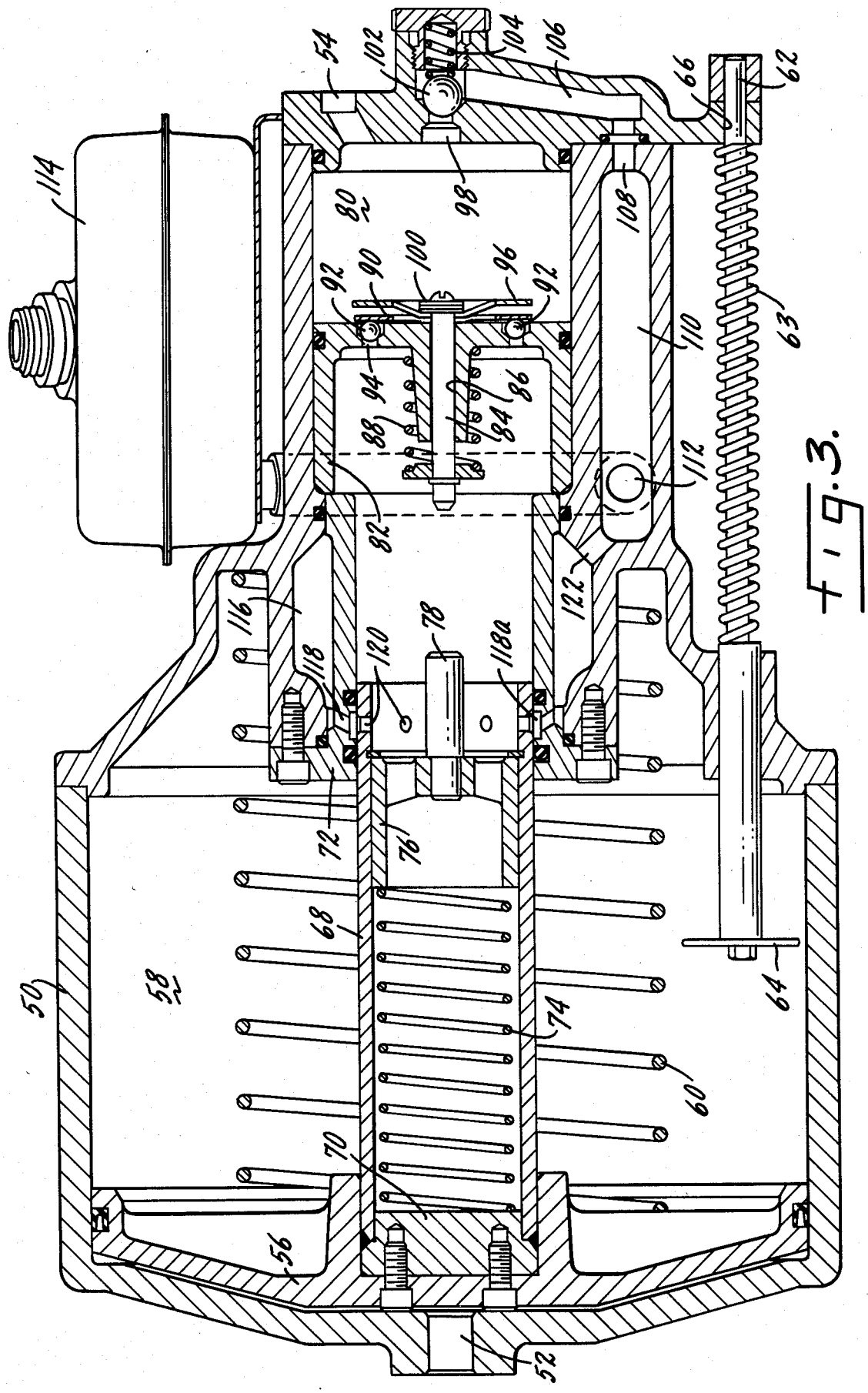
FIG. 3 is an axial section through a combination air brake cylinder and hydraulic slack adjuster which provides the fluid pressure to operate the hydraulic brake cylinder of FIG. 2.

It is conventional practice in railroad car brake systems to utilize an air cylinder to supply the mechanical force to operate the car brakes. Regulations of the AAR and Federal regulatory agencies require that travel of the brake cylinder piston rod within certain prescribed limits and, accordingly, it is a common practice to utilize a mechanical slack adjuster to take up and/or let out slack in the brake rigging as necessity demands. The present invention combines the air brake cylinder with a hydraulic slack adjuster into a single unit with the end result that the force output from the unit is a fluid pressure which is applied directly to a hydraulic brake cylinder which in turn applies the required operating force to move the shoes into braking contact with the wheels. The mechanical slack adjuster and associated mechanical linkage which carried the movement of the brake cylinder push rod to an application force by the shoes against the wheels has been replaced by a hydraulic piston and cylinder in the same housing as the brake cylinder with the end result that a single mechanism provides both the operating force and the slack adjusting functions previously accomplished by independent and separate elements.

In FIG. 1 a portion of a typical brake system is illustrated. A hydraulic brake cylinder 10, illustrated in detail in FIG. 2, will extend through openings in the bolster diagrammatically illustrated at 12. Opposite ends of cylinder 10 are connected by levers 14 and 16, respectively, to truck levers 18 and 20. Truck lever 18 has the conventional pivotal connection to the brake shoes, which connection is diagrammatically illustrated at 22. The truck lever conventionally will provide the same force on each brake shoe; however, for purposes of illustration, only a single such shoe has been shown. One end of truck lever 18 will be pivotally connected to the hand brake, as diagrammatically illustrated at 24. A spreader bar 26 pivotally connects levers 18 and 20 with the opposite end of lever 20 being connected to a dead lever anchor illustrated at 28 which is positioned on bolster 12. The dead lever anchor maintains the particular geometry of the brake linkage as illustrated in FIG. 1.

Hydraulic brake cylinder 10 includes a cylindrical barrel 30 having a jaw 32 at its left-hand end, which jaw is connected to brake lever 14. A fluid inlet port 34 is formed in jaw 32 and provides a means for admitting operating fluid pressure into cylinder 10. The opposite end of barrel 30 includes a guide bushing 36 having a central bore 38 which aligns a piston rod 40 having a jaw 42 with a connection for brake lever 16. Piston rod 40 is movable relative to barrel 30 and is held in its coaxially aligned position of FIG. 2 by an inner nut 44, the exterior of which slides upon the interior of barrel 30. Hydraulic brake cylinder 10 is completed by a floating piston 46 positioned between jaw 32 and the end of piston rod 40. Floating piston 46 has suitable seals bearing against the inside of barrel 30. There are other seals illustrated in FIG. 2 which have not been described as their designation and function are well known to those skilled in the art.

In operation, when the brakes are to be applied, fluid pressure will be applied at port 34, which fluid pressure will cause floating piston 46 to move to the right to the point where it contacts the end of piston rod 40. The continued application of pressure at the inlet will force the inner and outer sleeves to telescopically move to extend the length of the brake cylinder, thus providing a brake applying force to the brake shoes. When the brakes are released, the weight of the brake beams and shoes combined with the negative fluid pressure from the air-hydraulic cylinder will cause cylinder 10 to retract.

Typically, there will be a single air brake cylinder and hydraulic slack adjuster combination on each car which will provide fluid pressure for the illustrated brakes on each of the car trucks. The connections between the air brake cylinder hydraulic slack adjuster combination and the brake cylinders may be by armored hose or other means and one such connection is diagrammatically illustrated at 48 in FIG. 1.

Floating piston 46 permits the hand brake to telescopically extend cylinder 10 to operate the hand brakes.

The combination brake cylinder and hydraulic slack adjuster illustrated in FIG. 3 includes an outer housing 50 having a brake cylinder portion and a hydraulic portion. Housing 50 has an air inlet port 52 at the left-hand end and a fluid outlet port 54 at the right-hand end. The air pressure to port 52 will come from the ABDW control valve, as is conventional in railroad car brake systems and will be in the area of 50 psi. The fluid outlet pressure at port 54 may be on the order of about 800 psi.

An air piston 56 operates within a chamber 58 in the brake cylinder portion of housing 50 and faces air inlet port 52. A piston return spring 60 is positioned within chamber 58 and at one end is bottomed against piston 56 and at the other end against a portion of housing 50. Positioned adjacent one side of housing 50, as illustrated in FIG. 3, is an indicator rod 62 which has a head 64 positioned within chamber 58 and arranged to be contacted by piston 56 after its initial movement through a distance equal to normal brake cylinder piston rod travel. Rod 62 surrounded in part by a return spring 63, extends outwardly from housing 50 and extends through a bore 66 in a portion of the housing which aligns the indicator rod. Thus, movement of rod 62 will indicate to a car inspector that brake cylinder piston rod travel is that specified for proper operation of the brakes.

Positioned within housing 50, as described, is a hydraulic slack adjuster which includes a piston 68 attached by an end cap 70 to air piston 56 with the piston being guided and aligned by an internal housing cylindrical portion 72. Positioned in piston 68 is a spring 74 which bears against a slide 76 movable within the piston. Slide 76 has a projecting rod 78 at one end thereof whose function will be described hereinafter.

Positioned within a small chamber 80 of housing 50 is a second fluid piston 82 movable within the limits of chamber 80 and carrying a stem 84 positioned to be contacted by projecting rod 78. Stem 84 is positioned within a bore 86 in piston 82 and a coil spring 88 biases the stem to the position shown. At the right-hand end of stem 84 there is a flat spring 90 which applies a closing bias to a plurality of circumferentially-arranged balls 92 positioned to control the flow of fluid through concentrically arranged passages 94. A backup disc 96, also attached to the face of piston 82, limits the movement of balls 92 in response to differential fluid pressures within chamber 80.

At the right-hand end of housing 50 adjacent fluid outlet port 54 there is a small fluid passage 98 in alignment with a seal member 100 carried at the outer end of valve stem 84. Positioned within passage 98 is a relief valve 102 held in a passage closing position by a coil spring 104. Passage 98 connects with an additional passage 106 which in turn is connected through aligned ports 108 with a chamber 110 formed within housing 50. Chamber 110 in turn connects to a conduit 112 which is connected to a fluid reservoir 114 which may be mounted exteriorly of housing 50. Such an arrangement is not mandatory as the reservoir may be integral with the housing, however, the arrangement shown has been found to be convenient.

A further series of passages are connected to chamber 110 and include an annular chamber 116 extending about housing portion 72 and connected to the interior thereof by a series of small ports 118. Ports 118 communicate with a groove 118a which is in alignment, in the position shown, with a series of ports 120 formed at the interior end of sleeve 68. Thus, when the combination brake cylinder and slack adjuster is in the position shown, the interior of the fluid portion of the housing is in communication with reservoir 114 through ports 118 and 120, groove 118a, annular chamber 116 and chamber 110 which is connected to annular chamber 116 through a port 122. The entire interior of piston 68, housing portion 72, chamber 116 and both sides of chamber 80 or the sides of chamber 80 on each side of piston 82 are all filled with fluid in the normal at-rest position of the slack adjuster portion of the device.

In operation, air pressure will be applied to the left-hand side of piston 56, causing the piston to travel to the right as illustrated in FIG. 3. As the piston so moves, piston 68 will similarly move to the right with the first action being the closing of communication between ports 118 and 120, thus cutting off communication between fluid reservoir 114 and the fluid interior of the slack adjuster. Since the described chambers are filled with fluid, movement of piston 68 to the right will cause movement of pison 82 to the right forcing fluid in chamber 80 at the right-hand side of the piston outwardly from port 54 to the hydraulic brake cylinder in FIGS. 1 and 2. The application of such pressure will take up the slack in the rigging causing the brake shoes to contact the wheels.

Movement of piston 68 toward the right and the consequent discharge of fluid pressure from port 54 will also cause movement of piston 82 to the right and toward the end wall of housing 50 containing passage 98 and relief valve 102. After the brake shoes have been applied to the wheels, continued movement of piston 56 and piston 68 toward the right, will cause the increased pressure on the right-hand side of chamber 80 to be relieved by the opening of relief valve 102 and the discharge of hydraulic fluid from chamber 80 through the described passages into reservoir 114. This series of functions takes place in those instances in which there are new shoes in the brake system and thus there is a lack of slack in the brake rigging. The effect of bypassing some of the hydraulic fluid in chamber 80 through passages 106, 110 and 112 to reservoir 114 is to add slack into the brake rigging. Air piston 56 will move through the distance of allowed piston travel and such movement will have the effect of providing consequent movement to piston 82. If there is a lack of slack in the rigging, there will be the described bypass of fluid from chamber 80 to reservoir 114. To provide the final pressure from the brake shoes upon the wheels, assuming that piston 82 has moved completely to the right, wherein seal 100 has closed passage 98, the last few inches or portions of inches of travel of piston 56 will force fluid from the left-hand side of chamber 80, that is the back side of piston 82, through passages 94 as the pressure behind the passages overcomes that of spring 90, causing ball checks 92 to move off of their seats and open the passages. The pressure thus applied to port 54 will be used to apply final brake shoe pressure upon the wheels.

When a brake application is released, return spring 60 will move air piston 56 back to the left as illustrated in FIG. 3. Such movement will draw slide 76 and piston 68 with it. As these elements move to the left, the negative pressure on the left-hand side of piston 82 will cause it to move to the left and similarly, the negative pressure within chamber 80 will draw back fluid from brake cylinders 10. The weight of the brake rigging will assist in returning the slack adjuster to the FIG. 3 position.

At such time as the air hydraulic cylinder has returned to the position of FIG. 3, if there remains any void on the left-hand side of piston 82, hydraulic fluid will be drawn from reservoir 114, through aligned ports 118 and 120, into the interior of the hydraulic cylinder so that the hydraulic portion of the device is fully charged with hydraulic fluid. In the event that there was a lack of slack when the brakes were applied, there will be no negative pressure at the completion of brake release, as in fact it was necessary to add slack into the system and this was done by removal of fluid pressure from within the hydraulic cylinder and placing such hydraulic fluid within reservoir 114.

In the event the brakes are operated under a condition in which there is too much slack in the brake rigging, for example caused by worn brake shoes, piston 82 will have bottomed out at the right-hand side of housing 50, with its seal 100 closing passage 98 before there is a full application of brake pressure. Continued movement of piston 56 will force fluid pressure from the left-hand side of piston 82, through passages 94 and past ball checks 92, into port 54 to provide an appropriate brake application pressure in hydraulic brake cylinder 10. On the return stroke, or at brake release, when the mechanical parts have returned to the position of FIG. 3, there will in fact be negative pressure at the left-hand side of piston 82 and this negative pressure will be relieved or the space within the chamber will be filled by hydraulic fluid drawn from reservoir 114 through conduit 112, passage 122 and aligned ports 118 and 120.

In normal brake operation there is some very small degree of brake wear at each brake application, however such is relatively minor and normally change in the slack condition of a brake rigging is a very gradual thing unless the brake shoes are replaced. Such gradual changes in the brake rigging slack are normally accounted for by changes in the hydraulic fluid within the hydraulic cylinder in the manner described. In fact, under normal operating conditions there may be a small amount of fluid discharged from chamber 80 to reservoir 114 during brake application and a resupply of that fluid to the left-hand side of piston 82 upon brake release. This is not an abnormal situation and in fact, it is through such a normal exchange of fluid that changes in slack are accommodated.

The function of projection 78 of slide 76 is to effect a movement of valve stem 84 and its seal 100 to close passage 98 very slightly prior to the bottoming of piston 82 upon the right-hand wall of housing 50. Such normally takes place in a conventional operation of the air-hydraulic cylinder so that the final pressure applied to the brake shoes by discharge of fluid through port 54 is brought about by unseating ball checks 92 from passages 94 so that fluid from the left-hand side of piston 82 will pass into chamber 80 and then through port 54. Accordingly, in substantially every brake application, projection 78 will in fact cause movement of valve stem 84 to effect a closure of passage 98.

Of importance in the invention is the combination of the conventional air piston to operate the brakes and a hydraulic slack adjuster within a single housing and in which there is a direct response of the fluid pressure system to movement of the air piston. By uniquely combining the parts in a single housing and by attaching portions of the fluid piston structure directly to the air piston, there is immediate response to movement of the air piston by the hydraulic portion of the system.

Whereas the preferred form of the invention has been shown and described herein, it should be realized that there may be many modifications, substitutions and alterations thereto.

The embodiments of the invention in which an exclusive or privilege is claimed are defined as follows:

1. A combination air brake cylinder and hydraulic slack adjuster for a railroad car brake system including:
   a housing, an air-operated piston in said housing, an air port in said housing in communication with said air piston, a return spring in said housing for said air piston,
   a fluid outlet port in said housing, fluid piston and valve means within said housing connected to said air piston and responsive to brake application movement thereof to supply a brake shoe application fluid pressure at said outlet, said fluid piston and valve means including a first piston attached to said air piston and movable therewith, and a second piston, spaced from said first piston, and movable in response to fluid pressure forces created by movement of said first piston, a fluid reservoir, check valve controlled fluid passages within a portion of said housing for connecting said reservoir with opposite sides of said second piston for adjusting slack in the brake rigging during brake application functions, said second piston having a seal portion positioned to close said check valve controlled connecting passages during brake application movement of said hydraulic slack adjuster.

2. The structure of claim 1 further characterized in that said second piston carries a plurality of relief valve controlled passages therein for transferring fluid from one side of said second piston to the other, during brake application.

3. The structure of claim 1 further characterized by and including a movable valve stem positioned within said second piston, with said seal means being carried by said movable valve stem, with said first piston including means for causing movement of said second piston valve stem.

4. The structure of claim 3 further characterized in that said first piston means for causing movement of said second piston valve stem includes a spring-biased sleeve positioned therein.

5. The structure of claim 1 further characterized by and including an indicator rod extending outwardly from said housing and positioned for contact by said air-operated piston, movement of said rod by said air-operated piston indicating travel of said air-operated piston.

* * * * *